F. B. ADAM.
METERING PANEL BOARD.
APPLICATION FILED APR. 1, 1911.

1,168,774.

Patented Jan. 18, 1916.
2 SHEETS—SHEET 1.

Witnesses:
Geo. R. Radson
Wells L. Church

Inventor,
Fredrick B. Adam.
By Paul Bakewell Atty.

F. B. ADAM.
METERING PANEL BOARD.
APPLICATION FILED APR. 1, 1911.
1,168,774.
Patented Jan. 18, 1916.
2 SHEETS—SHEET 2.
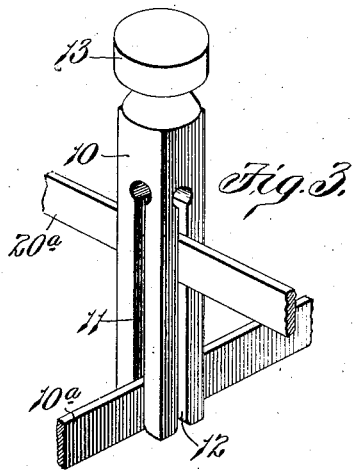
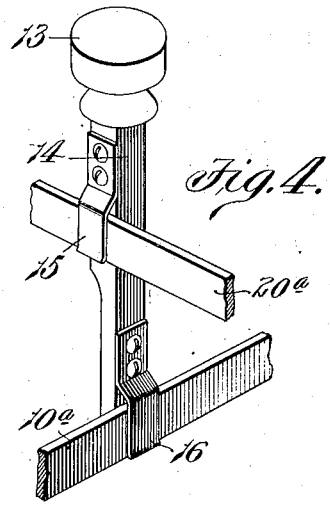
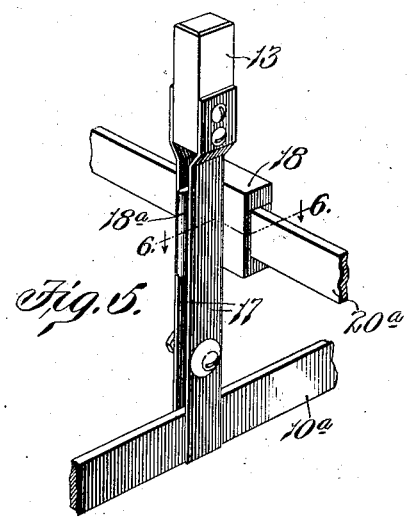
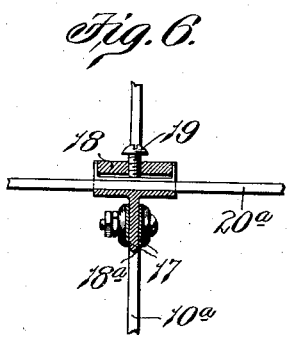

UNITED STATES PATENT OFFICE.

FREDRICK B. ADAM, OF ST. LOUIS, MISSOURI, ASSIGNOR TO FRANK ADAM ELECTRIC COMPANY, OF ST. LOUIS, MISSOURI, A CORPORATION OF MISSOURI.

METERING PANEL-BOARD.

1,168,774.  Specification of Letters Patent.  Patented Jan. 18, 1916.

Application filed April 1, 1911. Serial No. 618,334.

*To all whom it may concern:*

Be it known that I, FREDRICK B. ADAM, a citizen of the United States, residing at St. Louis, Missouri, have invented a certain new and useful Improvement in Metering Panel-Boards, of which the following is a full, clear, and exact description, such as will enable others skilled in the art to which it appertains to make and use the same.

This invention relates to panel boards, and particularly to metering panel boards such as are generally used in office buildings and other structures that contain a number of rooms or suites of rooms having separate and distinct electric-light or power circuits which have to be separately metered.

The main object of my invention is to provide a metering panel board of novel construction in which the meter bus bars and circuit bus bars are so designed and arranged that any particular meter bus bar can be selected easily and connected up to any particular circuit bus bars or bars.

Another object is to provide a compact metering panel board of sufficient capacity to coöperate with a large number of meters but which is not much larger than an ordinary distributing panel board.

Other objects and desirable features of my invention will be hereinafter pointed out.

Figure 1:
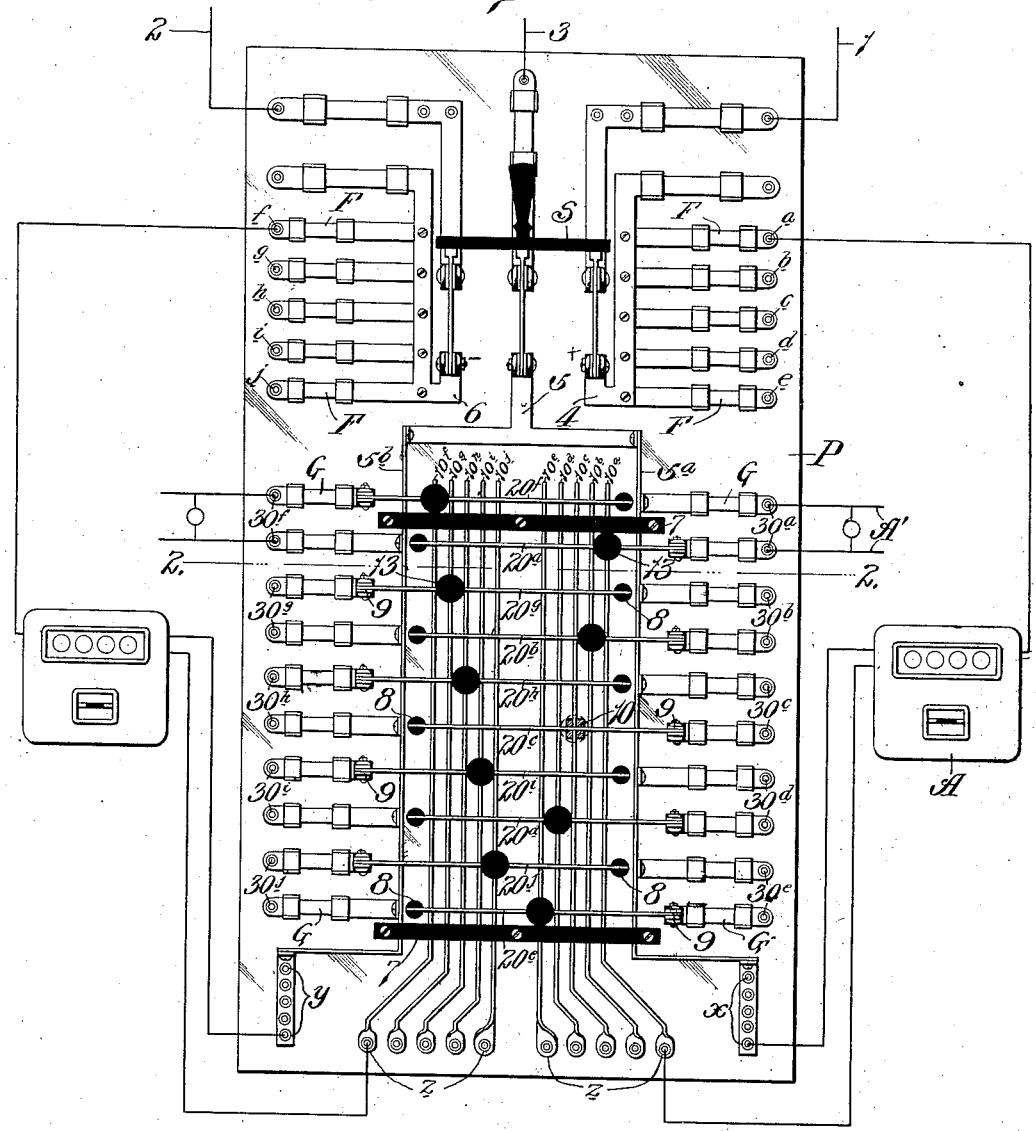
Figure 2:
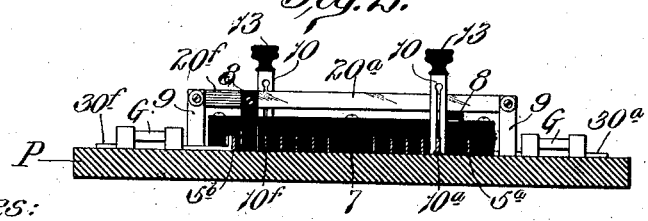

Figure 1 of the drawings is a front elevational view of a metering panel board constructed in accordance with my invention; Fig. 2 is a horizontal cross sectional view taken on the line 2—2 of Fig. 1; Fig. 3 is a perspective view of one form of device that can be used for connecting the meter bus bars and circuit bus bars together; Fig. 4 is a perspective view of another form of device that can be used for this purpose; Fig. 5 is a perspective view of a bus bar connecting device which is so designed that the possibility of a careless person making a wrong connection is reduced to a minimum; and Fig. 6 is a horizontal sectional view taken on the line 6—6 of Fig. 5.

Referring to the drawings which illustrate the preferred form of my invention, P designates a supporting member commonly termed a "board" which is made up of one or more slabs or sections of slate or other suitable insulating material. The metering panel herein shown is designed for a three-wire system of electrical distribution but it will, of course, be understood that it could be used equally well with a two-wire system. The positive and negative wires 1 and 2 and the neutral wire 3 of the distributing system are connected by suitable bus bars to the spring contacts of a switch S of any preferred design which coöperates with three bus bars 4, 5 and 6 arranged on the front face of the board. The bus bar 4 which I will designate as the positive bus bar, coöperates with one set of meter terminals designated by the reference characters $a$, $b$, $c$, $d$, and $e$, and the bus bar 6 which I will designate as the negative bus bar, coöperates with another set of meter terminals designated by the reference characters $f$, $g$, $h$, $i$ and $j$, said meter terminals being protected by suitable fuses F of any preferred type or design.

The bus bar 5 which I will designate as the neutral bus bar, is provided with two branches $5^a$ and $5^b$ that extend longitudinally of the board P, and each of said branches coöperates with a set of shunt wire terminals to which the shunt wires from the meters are connected, the set of shunt wire terminals with which the branch $5^a$ coöperates, being designated by the reference character $x$, and the set with which the branch $5^b$ of the neutral bus bar coöperates, being designated by the reference character $y$.

Two sets of meter bus bars extend longitudinally of the board, and circuit bus bars extend at right angles to said meter bus bars transversely of the board. These meter bus bars and circuit bus bars are formed from flat strips or bars of metal that are arranged edgewise, or at right angles to the front face of the board, and the circuit bus bars are preferably arranged over the meter bus bars, as shown in Figs. 1 and 2. By arranging the meter bus bars and circuit bus bars in this manner I am able to mount a large number of bus bars on the board, thereby producing a compact panel board of sufficient capacity to serve a large number of meters; and another advantage of such a construction is that it permits the use of a simple and efficient friction connecting device, hereinafter described, for connecting the meter bars and circuit bars together. The set of meter bus bars which coöperate with the set of meter terminals $a$ to $e$, are designated by the reference characters 10ª, 10ᵇ, 10ᶜ, 10ᵈ and 10ᵉ, and the set of meter bus bars which coöperate with the set of meter terminals *f* to *j*, are designated by the reference characters 10ᶠ, 10ᵍ, 10ʰ, 10ⁱ and 10ʲ, each of said meter bus bars being provided at one end (the lower end of the structure herein shown) with a terminal *z* to which the return wire of the meter is adapted to be connected.

Ten circuit bus bars, designated by the reference characters 20ª to 20ʲ, inclusive, are provided, and each of said circuit bus bars is connected to one of a pair of circuit terminals, the five pairs of circuit terminals on the righthand side of the board being designated by the reference characters 30ª to 30ᵉ, inclusive, and the five pairs of circuit terminals on the other side of the board, being designated by the reference characters 30ᶠ to 30ʲ, inclusive. The terminal of each of said pairs which is not connected to a circuit bus bar is connected to the neutral bus bar 5 by means of the branches 5ª and 5ᵇ of said neutral bus bar.

The meter bus bars are retained in position and held spaced away from each other by means of strips of insulating material 7 on the front face of the board provided with slots in which the meter bus bars are arranged, as shown in Fig. 2, and each circuit bus bar is connected at one end to a post 8 of insulating material and at its opposite end to a metal post or standard 9 that forms part of a fuse-holder, the board being provided with suitable holders for receiving fuses G that protect the circuit terminals.

As shown in Fig. 2 of the drawings, each circuit bus bar is supported only at its extreme ends and extends transversely across both sets of meter bus bars. A connecting device is slidingly mounted on each of the bus bars, and as the circuit bus bars are supported only at their extreme ends, the connecting devices on any of the circuit bus bars can be slid along same and connected to any meter bus bar on the board without removing the connecting device from its coöperating circuit bus bar.

The devices which are used for connecting the meter bus bars and circuit bus bars together may be formed in the manner shown in either Figs. 3, 4 or 5. The device shown in Fig. 3 consists of a rod 10 of metal provided with two right angularly disposed longitudinally extending slots 11 and 12 that separate the bar into four legs and thus enable the device to be slipped over a meter bus bar and the circuit bus bar that crosses said meter bus bar at the point where said connecting device is mounted on the meter bar, said connecting device being provided at its upper end with a cap or head-piece 13 formed of suitable insulating material. The connecting device shown in Fig. 4 will produce the same result as the one shown in Fig. 3 but it is constructed in a little different manner, and consists of a rod 14 of metal provided with spring clips 15 and 16 which are so arranged that the clip 16 will engage a meter bus bar and the clip 15 will engage the circuit bus bar that crosses said meter bus bar at the point where the connecting device is mounted on said meter bus bar, said device being provided with a head or cap 13 of insulating material. The connecting device shown in Fig. 5 is so constructed that the possibility of a careless person making a wrong connection is reduced to a minimum, said device consisting of a pair of spring arms 17 that are adapted to embrace a meter bus bar and a block 18 that is adapted to be securely connected to the circuit bus bar by means of a set screw 19 or other suitable device, said block 18 being separate and distinct from the arms 17, and provided with a shank 18ª that projects between said arms 17 when the device is arranged in operative position, a suitable cap or head 13 of insulating material being connected to the upper ends of the arms 17.

The meter A is connected to the meter terminal *a* and to the terminal of the meter bus bar 10ª and the shunt wire of said meter is connected to one of the shunt wire terminals *x*, as shown in Fig. 1. If it is desired to connect the circuit A′ to the meter A, one of the bus bar connecting devices is slipped over the circuit bus bar 20ª and the meter bus bar 10ª in the manner illustrated in Fig. 1, and shown clearly in Fig. 3, thereby establishing a direct connection between the circuit A′ and the meter A. If it is desired to disconnect the meter from the circuit, the bus bar connecting device is simply slipped off the bus bars by drawing it outwardly away from the panel board P. If it is desired to connect all of the circuits on one side of the board to the meter A, namely, the circuits with which the circuit terminals 30ª to 30ᵉ coöperate, bus bar connecting devices are arranged in engagement with the meter bus bar 10ª and with the circuit bus bars 20ª to 20ᵉ, inclusive. The bus bar connecting device shown in Fig. 5 can be applied and removed as easily as the bus bar connecting devices shown in Figs. 3 and 4 when it is desired to merely connect or disconnect the circuit with which it coöperates and the meter for said circuit, but the connecting device shown in Fig. 5 has one desirable feature which the other forms of connecting devices shown in Figs. 3 and 4 do not possess, namely, it is impossible to place two connecting devices on the same circuit bus bar and thus produce a wrong connection, owing to the fact that the block 18 which forms part of the connecting device shown in Fig. 5 cannot be removed from the circuit bus bar on which it is mounted although it can be adjusted longitudinally of same to enable the circuit bus bar on which it is arranged to be connected up to other meter bus bars on the board.

The main advantage of a metering panel board of the construction above described is that all of the circuit bus bars and meter bus bars are exposed to view and are so arranged that the operator can slide a particular connecting device longitudinally of its supporting circuit bus bar and connect it to any meter bus bar on the board without removing said connecting device from the circuit bus bar on which it is mounted. Furthermore, the connection between the bus bars can be effected easily by simply forcing the connecting device onto the bus bars; and another desirable feature of such a structure is that a perfect contact is insured by reason of the fact that the bus bar connecting device has spring portions or resilient portions which snugly embrace the bus bars. The fact that the circuit bus bars and meter bus bars are arranged edgewise, or at right angles to the face of the board, makes it possible to use a comparatively small board for a large number of meters.

While I have herein shown the meter terminals and the switch of the distributing system arranged at the upper end of the board it will, of course, be understood that these elements could be arranged at the lower end of the board and the meter bus bars reversed if so desired.

Having thus described my invention, what I claim as new and desire to secure by Letters Patent is:

In a panel board, a slab of insulating material, vertically-disposed meter bus bars arranged on said slab, a set of return wire meter terminals connected to said meter bus bars, a plurality of circuit bus bars arranged transversely of said meter bus bars and spaced away therefrom, adjustable connecting devices for establishing electrical connection between selected meter and circuit bus bars, pairs of circuit terminals arranged on the front face of said slab, adjacent the side edges of same, one terminal of each pair being connected to one of said circuit bus bars, a support of insulating material for the free end of each of said circuit bus bars, a neutral bus bar arranged on the front face of said slab and having branches that extend parallel to the meter bus bars and which are connected to the other terminals of each of said pairs of circuit terminals, and transversely arranged strips of insulating material connected to the front face of said slab, each of said strips being provided on its underside with spaced slots that receive said meter bus bars and said neutral bus bar branches and thus hold said bars in a certain spaced relation to each other.

In testimony whereof I hereunto affix my signature in the presence of two witnesses, this thirtieth day of March 1911.

FREDRICK B. ADAM.

Witnesses:
WELLS L. CHURCH,
GEORGE BAKEWELL.